(12) United States Patent
Ahn et al.

(10) Patent No.: US 11,757,137 B2
(45) Date of Patent: Sep. 12, 2023

(54) BATTERY PACK

(71) Applicant: SAMSUNG SDI CO., LTD., Yongin-si (KR)

(72) Inventors: Jaepil Ahn, Yongin-si (KR); Kisuk Son, Yongin-si (KR); Chuljung Yun, Yongin-si (KR); Kyungho Cho, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 109 days.

(21) Appl. No.: 16/961,092

(22) PCT Filed: Nov. 7, 2018

(86) PCT No.: PCT/KR2018/013448
§ 371 (c)(1),
(2) Date: Jul. 9, 2020

(87) PCT Pub. No.: WO2019/139235
PCT Pub. Date: Jul. 18, 2019

(65) Prior Publication Data
US 2020/0358146 A1 Nov. 12, 2020

(30) Foreign Application Priority Data
Jan. 10, 2018 (KR) .................. 10-2018-0003352

(51) Int. Cl.
*H01M 10/42* (2006.01)
*H01M 10/44* (2006.01)
*H01M 10/48* (2006.01)
*H01R 12/58* (2011.01)
(Continued)

(52) U.S. Cl.
CPC ....... *H01M 10/425* (2013.01); *H01M 10/441* (2013.01); *H01M 10/443* (2013.01);
(Continued)

(58) Field of Classification Search
CPC ............ H01M 10/482; H01M 50/502; H01M 10/425; H01M 10/441; H01M 10/443;
(Continued)

(56) References Cited

U.S. PATENT DOCUMENTS 4,597,625 A * 7/1986 Seidler ................ H01R 12/716
439/444
6,350,145 B1 2/2002 Chen et al.
(Continued)

FOREIGN PATENT DOCUMENTS

CN 202601898 U 12/2012
EP 2899809 A1 7/2015
(Continued)

OTHER PUBLICATIONS

European Search Report dated Oct. 4, 2021.
International Search Report dated Feb. 13, 2019 for PCT/KR2018/013448.

*Primary Examiner* — Brian R Ohara
*Assistant Examiner* — Aaron J Salter
(74) *Attorney, Agent, or Firm* — Lee IP Law, P.C.

(57) ABSTRACT

A battery pack includes: a plurality of battery cells; a battery management system to acquire state information and control charge-discharge operations; a wiring board through which the state information is transmitted to the battery management system, the wiring board including conductive lines for transmitting different electrical signals; and a connector including a connector terminal coupled to the conductive lines and a connector housing accommodating the connector terminal, the connector being coupled to a mating connector of the battery management system, wherein the connector terminal includes a bottom plate accommodating the conductive lines, and barrels protruding upward from the bottom plate and configured to be compressed onto the conductive lines while surrounding the conductive lines, and (Continued)

first and second embossments on the bottom plate and the barrels of the connector terminal, the first and second embossments protruding toward the conductive lines.

21 Claims, 12 Drawing Sheets

(51) Int. Cl.
*H01M 50/509* (2021.01)
*H01M 50/51* (2021.01)
*H01M 50/512* (2021.01)
*H01M 50/505* (2021.01)
*H01M 50/569* (2021.01)

(52) U.S. Cl.
CPC ......... *H01M 10/48* (2013.01); *H01M 10/482* (2013.01); *H01M 10/486* (2013.01); *H01M 50/505* (2021.01); *H01M 50/509* (2021.01); *H01M 50/51* (2021.01); *H01M 50/512* (2021.01); *H01M 50/569* (2021.01); *H01R 12/58* (2013.01); *H01M 2010/4271* (2013.01)

(58) Field of Classification Search
CPC ........ H01M 10/486; H01M 2010/4271; H01R 12/58
See application file for complete search history.

(56) References Cited

U.S. PATENT DOCUMENTS

| | | | |
|---|---|---|---|
| 6,565,376 | B2 | 5/2003 | Aoki |
| 7,301,104 | B2 | 11/2007 | Miura et al. |
| 2006/0234521 | A1* | 10/2006 | Uchida ................ H01R 12/728 439/55 |
| 2015/0188244 | A1 | 7/2015 | Yoshioka et al. |
| 2017/0279105 | A1 | 9/2017 | Zhao et al. |
| 2018/0205192 | A1* | 7/2018 | Rhein ................ H01M 50/507 |

FOREIGN PATENT DOCUMENTS

| | | |
|---|---|---|
| JP | 1998-275642 A | 10/1998 |
| JP | 2001-230007 A | 8/2001 |
| JP | 2009-209402 A | 9/2009 |
| JP | 4551776 B2 | 7/2010 |
| JP | 2013-229229 A | 11/2013 |
| JP | 2017-004703 A | 1/2017 |
| KR | 10-0702399 B1 | 3/2007 |
| KR | 10-2014-0015846 A | 2/2014 |
| KR | 10-2016-0094909 A | 8/2016 |
| KR | 10-1720614 B1 | 3/2017 |

* cited by examiner

BATTERY PACK

CROSS REFERENCE TO RELATED APPLICATIONS

This is the U.S. national phase application based on PCT/KR2018/013448, filed Nov. 7, 2018, which is based on Korean Patent Application No. 10-2018-0003352 filed on Jan. 10, 2018, the entire contents of all of which are hereby incorporated by reference.

TECHNICAL FIELD

The present disclosure relates to a battery pack.

BACKGROUND ART

In general, secondary batteries refer to batteries that can be repeatedly charged and recharged unlike non-rechargeable primary batteries. Secondary batteries are used as energy sources of devices such as mobile devices, electric vehicles, hybrid electric vehicles, electric bicycles, and uninterruptible power supplies. Single-cell secondary batteries or multi-cell secondary batteries (battery packs) each including a plurality of cells connected to each other as a unit are used according to the types of devices that employ secondary batteries.

Small mobile devices such as cellular phones may be operated for a predetermined time using single-cell secondary batteries. However, battery packs having high-output, high-capacity features may be suitable for devices having long operating times and consuming large amounts of power such as electric vehicles and hybrid electric vehicles. The output voltages or currents of battery packs may be increased by adjusting the number of battery cells included in the battery packs.

Such a battery pack may include a measuring unit configured to collect battery cell state information such as battery cell voltages, temperatures, or the like for controlling the charge-discharge operations of battery cells while previously detecting abnormal operations of the battery cells such as overheating, overcharging, or overdischarging to take protective measures.

DESCRIPTION OF EMBODIMENTS

Technical Problem

An embodiment of the present disclosure includes a battery pack configured to precisely control the charge-discharge operations of battery cells based on correct state information of the battery cells by preventing distortion of signals giving information about the states of the battery cells.

Solution to Problem

A battery pack of the present disclosure includes:
a plurality of battery cells;
a battery management system configured to acquire state information of the plurality of battery cells and control charge-discharge operations of the plurality of battery cells;
a wiring board through which the state information of the plurality of battery cells is transmitted to the battery management system, the wiring board including a plurality of conductive lines for transmitting different electrical signals; and a connector including a connector terminal coupled to the plurality of conductive lines and a connector housing accommodating the connector terminal, the connector being coupled to a mating connector of the battery management system, wherein the connector terminal includes a bottom plate accommodating the plurality of conductive lines, and barrels protruding upward from the bottom plate and configured to be compressed onto the plurality of conductive lines while surrounding the plurality of conductive lines, and first and second embossments are formed on the bottom plate and the barrels of the connector terminal, the first and second embossments protruding toward the plurality of conductive lines for being respectively brought into tight contact with lower and upper surfaces of the plurality of conductive lines.

Advantageous Effects of Disclosure

According to the present disclosure, a battery pack is configured to improve conductive lines which transmit the state information of battery cells such as voltage and temperature information, and improve the connection structure between connectors which collect the state information of the battery cells transmitted through the conductive lines and transmit the collected state information to a battery management system (BMS), such that the battery pack may precisely control the charge-discharge operations of the battery cells based on correct state information of the battery cells owing to a decrease in contact resistance and the prevention of signal distortion at the conductive lines.

BEST MODE

Figure 1:
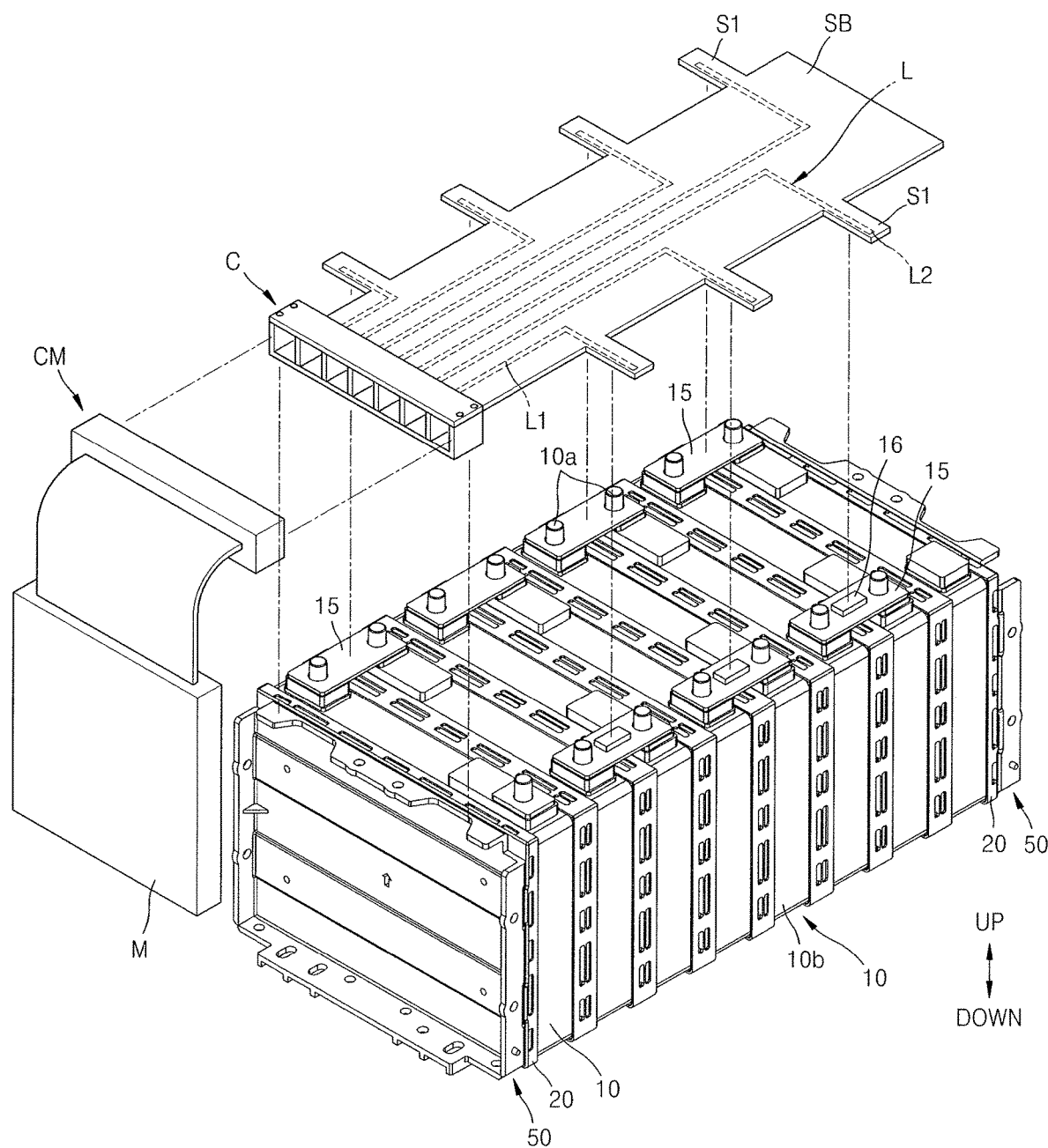
FIG. 1 is a view illustrating a battery pack according to an embodiment of the present disclosure.

A battery pack of the present disclosure includes:

a plurality of battery cells;

a battery management system configured to acquire state information of the plurality of battery cells and control charge-discharge operations of the plurality of battery cells;

a wiring board through which the state information of the plurality of battery cells is transmitted to the battery management system, the wiring board including a plurality of conductive lines for transmitting different electrical signals; and a connector including a connector terminal coupled to the plurality of conductive lines and a connector housing accommodating the connector terminal, the connector being coupled to a mating connector of the battery management system, wherein the connector terminal includes a bottom plate accommodating the plurality of conductive lines, and barrels protruding upward from the bottom plate and configured to be compressed onto the plurality of conductive lines while surrounding the plurality of conductive lines, and first and second embossments are formed on the bottom plate and the barrels of the connector terminal, the first and second embossments protruding toward the plurality of conductive lines for being respectively brought into tight contact with lower and upper surfaces of the plurality of conductive lines.

For example, the first and second embossments respectively make electrical contact with the lower and upper surfaces of the plurality of conductive lines.

For example, the first and second embossments are respectively embossed on the bottom plate and the barrels to have an embossed shape on a side and a depressed shape on an opposite side.

For example, the second embossments are formed at inner positions of the barrels which are away from leading edges of the barrels.

For example, cut surfaces are formed on the leading edges of the barrels.

For example, a plating film is formed on surfaces of the first and second embossments.

For example, the plating film is formed on a base metal of the connector terminal.

For example, the base metal is exposed at leading edges of the barrels without being covered with the plating film.

For example, the wiring board further includes an insulating base board formed between the plurality of conductive lines to physically couple the plurality of conductive lines to each other and insulate the plurality of conductive lines from each other.

For example, the plurality of conductive lines include first end portions coupled to the connector terminal, and upper and lower surfaces of the first end portions in a thickness direction of the base board are exposed from the base board.

For example, through-holes are formed in the base board to receive the barrels therethrough.

For example, the through-holes are formed through both sides of the base board adjacent to the plurality of conductive lines, the through-holes being alternately arranged on left and right sides of the plurality of conductive lines at staggered positions along a length of the plurality of conductive lines.

For example, the barrels are fitted into the through-holes and are compressed onto the plurality of conductive lines from the staggered positions which are arranged on the left and right sides of the plurality of conductive lines along the length of the plurality of conductive lines.

For example, the barrels are compressed onto upper surfaces of the plurality of conductive lines, and lower surfaces of the plurality of conductive lines biased by the barrels are compressed onto the bottom plate.

For example, the connector terminal includes:

a receiving portion formed on an end thereof and coupled to the plurality of conductive lines while receiving the plurality of conductive lines; and a coupling portion formed on another end opposite the receiving portion and having a complementary shape matching the mating connector of the battery management system.

For example, the receiving portion includes the bottom plate and the barrels.

For example, the plurality of conductive lines include:

first end portions formed on ends thereof, the first end portions being physically coupled to the connector terminal and configured to output the state information of the plurality of battery cells to the battery management system; and second end portions formed other ends thereof which are opposite the first end portions, the second end portions being configured to receive the state information of the plurality of battery cells.

For example, the first end portions of the plurality of conductive lines are collected in a dense form by the connector and are connected to the battery management system, and the second end portions of the plurality of conductive lines are distributed to different positions toward different battery cells.

For example, the second end portions of the plurality of conductive lines are electrically connected to bus bars which electrically connect different battery cells.

For example, the second end portions of the plurality of conductive lines are electrically connected to thermistors arranged on upper surfaces of the plurality of battery cells.

For example, the state information transmitted through the plurality of conductive lines includes voltage information and temperature information of the plurality of battery cells.

For example, the connector terminal includes a plurality of connector terminals coupled to the plurality of conductive lines in a one-to-one manner, and assembly positions of the plurality of connector terminals are aligned by the connector housing.

MODE OF DISCLOSURE

Hereinafter, battery packs of the present disclosure will be described with reference to the accompanying drawings.

FIG. 1 is a view illustrating a battery pack according to an embodiment of the present disclosure.

Referring to the drawing, the battery pack may include: a plurality of battery cells 10; a wiring board S configured to transmit state information of the battery cells 10; and a battery management system (BMS) M configured to receive the state information of the battery cells 10 through the wiring board S and control the charge-discharge operations of the battery cells 10.

The battery cells 10 may be arranged in one direction, and spacers 20 may be arranged between the battery cells 10 adjacent to each other for guaranteeing thermal and electrical insulation between the battery cells 10. The spacers 20 may have a position alignment structure for the battery cells 10 and may thus improve the overall rigidity of the battery pack.

A pair of end plates 50 may be arranged on both outmost sides in the arrangement direction of the battery cells 10. The pair of end plates 50 may structurally joint together the battery cells 10 arranged therebetween and may include flanges to reinforce the overall rigidity of the battery pack.

The battery cells 10 forming the battery pack may be electrically connected to each other. More specifically, each battery cell 10 may be electrically connected to another battery cell 10 adjacent thereto through a bus bar 15 such that bus bars 15 may connect the battery cells 10 in parallel to each other by connecting identical polarities together, the battery cells 10 in series to each other by connecting opposite polarities together, or the battery cells 10 in series-parallel to each other.

Each of the battery cells 10 may include a case 10*b* accommodating an electrode assembly (not shown), and electrodes 10*a* exposed from the case 10*b*. The bus bars 15 may electrically connect the battery cells 10 adjacent to each other by connecting the electrodes 10*a* of the battery cells 10.

Status information such as the voltages or temperatures of the battery cells 10 may be collected in the BMS (M) through the wiring board (S). The wiring board S may transmit electrical signals related to the voltages or temperatures of the battery cells 10 to the BMS (M).

The wiring board S may include a plurality of conductive lines L, and each of the conductive lines L may include: a first end portion L1 which is adjacent to the BMS (M) and through which battery cell state information is output to the BMS (M); and a second end portion L2 which is adjacent to the battery cells 10 and through which battery cell state information is input. The first end portions L1 of the conductive lines L may correspond to output points of the conductive lines L through which the state information of the battery cells 10 is output, and may correspond to contacts between the conductive lines L and a connector C.

The connector C collects the conductive lines L in a dense form to electrically connect the conductive lines L to a mating connector CM on a side of the BMS (M), thereby forming an electrical connection between the wiring board S and the BMS (M). The first end portions L1 of the conductive lines L may be collected substantially at the same position by the connector C. Therefore, the first end portions L1 of the conductive lines L may be referred to as the first end portions L1 of the wiring board S, and it may be understood that all the first end portions L1 of the conductive lines L and the first end portions L1 of the wiring board S are at the same position.

The second end portions L2 of the conductive lines L may correspond to input points of the conductive lines L through which the state information of the battery cells 10 is input. For example, the second end portions L2 of the conductive lines L may correspond to contacts between the bus bars 15 and the conductive lines L, and voltage signals of the battery cells 10 may be input through the second end portions L2 of the conductive lines L. For example, the bus bars 15 (or wires connected to the bus bars 15) and the conductive lines L may be electrically connected to each other by forming contacts therebetween through a welding or soldering process, and the contacts between the bus bars 15 and the conductive lines L may correspond to the second end portions L2 of the conductive lines L through which voltage signals of the battery cells 10 are input in the present disclosure.

In addition, the second end portions L2 of the conductive lines L may correspond to input points of the conductive lines L through which temperature signals of the battery cells 10 are input. For example, the second end portions L2 of the conductive lines L may correspond to contacts between thermistors 16 and the conductive lines L, and temperature signals of the battery cells 10 may be input through the second end portions L2 of the conductive lines L. For example, the thermistors 16 (or wires connected to the thermistors 16) and the conductive lines L may be electrically connected to each other by forming contacts therebetween through a welding or soldering process, and the contacts between the thermistors 16 and the conductive lines L may correspond to the second end portions L2 of the conductive lines L through which temperature signals of the battery cells 10 are input in the present disclosure.

Unlike the first end portions L1, the second end portions L2 of the conductive lines L may be distributed to different positions. For example, the second end portions L2 of the conductive lines L may be distributed to different positions to transmit voltage information and temperature information of different battery cells 10. The conductive lines L of the wiring board S may transmit the state information of the battery cells 10 arranged at different positions, and to this end, the second end portions L2 of the conductive lines L may be distributed to different positions.

For example, each of the second end portions L2 of the conductive lines L may correspond to a contact with a bus bar 15 having the same electrical potential as that of an electrode 10*a* of a battery cell 10, and the voltage information of the battery cell 10 may be input to the second end portion L2 of the conductive line L through the bus bar 15.

In addition, each of the second end portions L2 of the conductive lines L may correspond to a contact with a thermistor 16 placed on a bus bar 15 thermally connected to a battery cell 10, and the temperature information of the battery cell 10 may be input to the second end portion L2 of the conductive line L from the thermistor 16.

In an embodiment of the present disclosure, the second end portions L2 of the conductive lines L may correspond to contacts with the bus bars 15 (or wire connected to the bus bars 15), or contacts with the thermistors 16 (or wires connected to the thermistors 16) arranged on the bus bars 15, and voltage signals or temperature signals of the battery cells 10 may be input through the contacts. However, the present disclosure is not limited thereto, and in another embodiment of the present disclosure, the second end portions L2 of the conductive lines L may form contacts directly with the electrodes 10*a* of the battery cells 10 instead of forming contacts with the bus bars 15, and the voltage information of the battery cells 10 may be input to the second end portions L2 of the conductive lines L through the contacts. Furthermore, in another embodiment of the present disclosure, the second end portions L2 of the conductive lines L may form contacts with the thermistors 16 arranged on upper surfaces of the cases 10*b* of the battery cells 10 instead of forming contacts with the thermistors 16 arranged on the bus bars 15 which connect the battery cells 10 to each other, and the temperature information of the battery cells 10 may be input to the second end portions of the conductive lines L through the contacts. In addition, the wiring board S may include a plurality of branch portions S1 extending from a main body of the wiring board S toward the bus bars 15 to form the second end portions L2 of the conductive lines L.

The wiring board S may include an insulating base board SB and the conductive lines L formed on the base board SB. For example, the conductive lines L may be formed by finely patterned copper wires. The conductive lines L may be electrically insulated from each other by the insulating base board SB. The base board SB may be formed between the conductive lines L to physically couple the conductive lines L to each other and electrically insulate the conductive lines L from each other.

As described with reference to FIG. 1, the conductive lines L may include the first end portions L1 adjacent to the BMS (M) and the second end portions L2 adjacent to the battery cells 10, and signals containing information about the states of the battery cells 10 may be transmitted between the first end portions L1 and the second end portions L2. Sensors such as the thermistors 16 for converting the temperature information of the battery cells 10 into electrical signals may be connected to sides of the second end portions L2 of the conductive lines L, and temperature signals converted into electrical signals by the thermistors 16 may be input to the conductive lines L through the second end portions L2 of the conductive lines L. In addition, the second end portions L2 of the conductive lines L may be connected to the bus bars 15, and voltage signals of the battery cells 10 may be input to the conductive lines L through the bus bars 15 which have the same electrical potentials as the electrodes 10 of the battery cells 10.

The connector C may be connected to the first end portions L1 of the conductive lines L. The conductive lines L may be collected in a dense form by the connector C and may be coupled to the mating connector CM on a side of the BMS (M), and thus an electrical connection may be formed between the wiring board S and the BMS (M).

Figure 2:
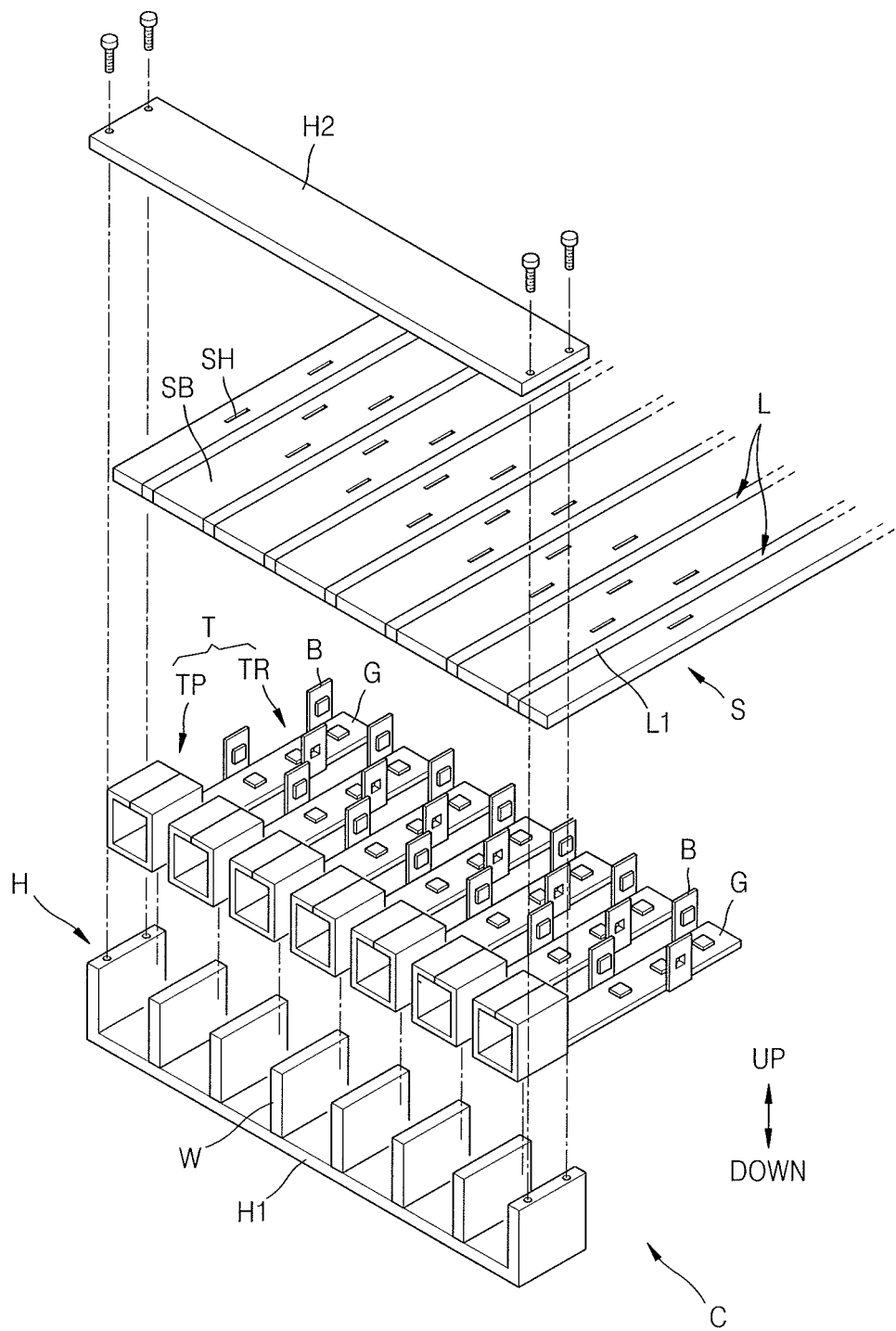
FIG. 2 is a perspective view illustrating a first end portion side of a wiring board illustrated in FIG. 1.
Figure 3:
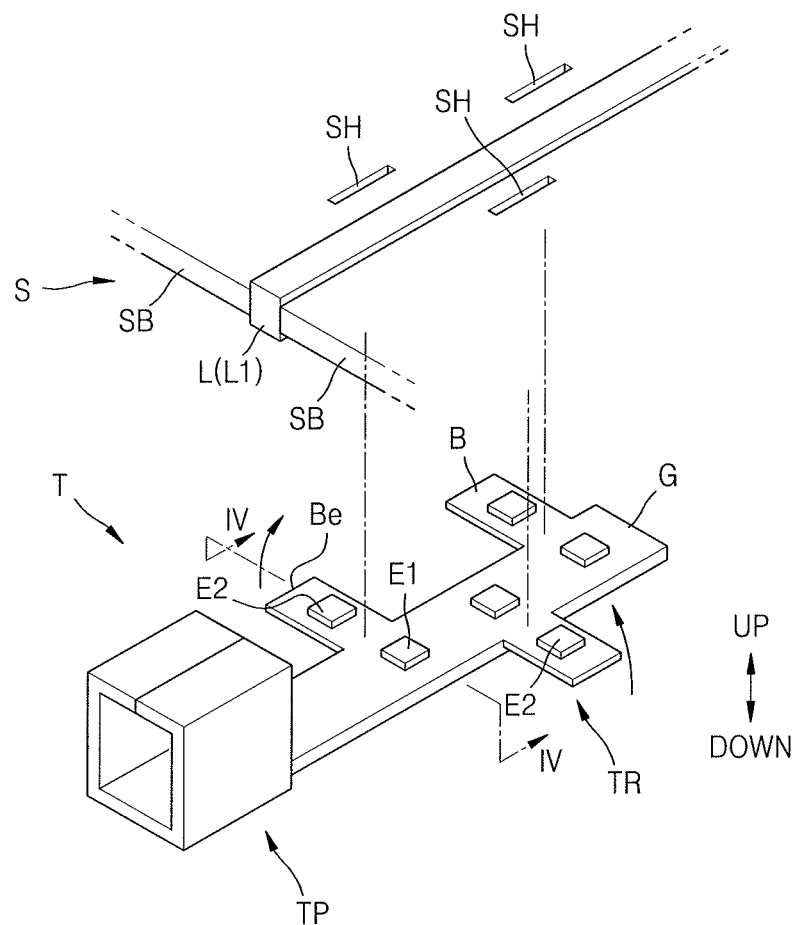
FIG. 3 is a view illustrating a structure of a connector terminal configured to form an electrical contact with a conductive line illustrated in FIG. 2.
Figure 4:
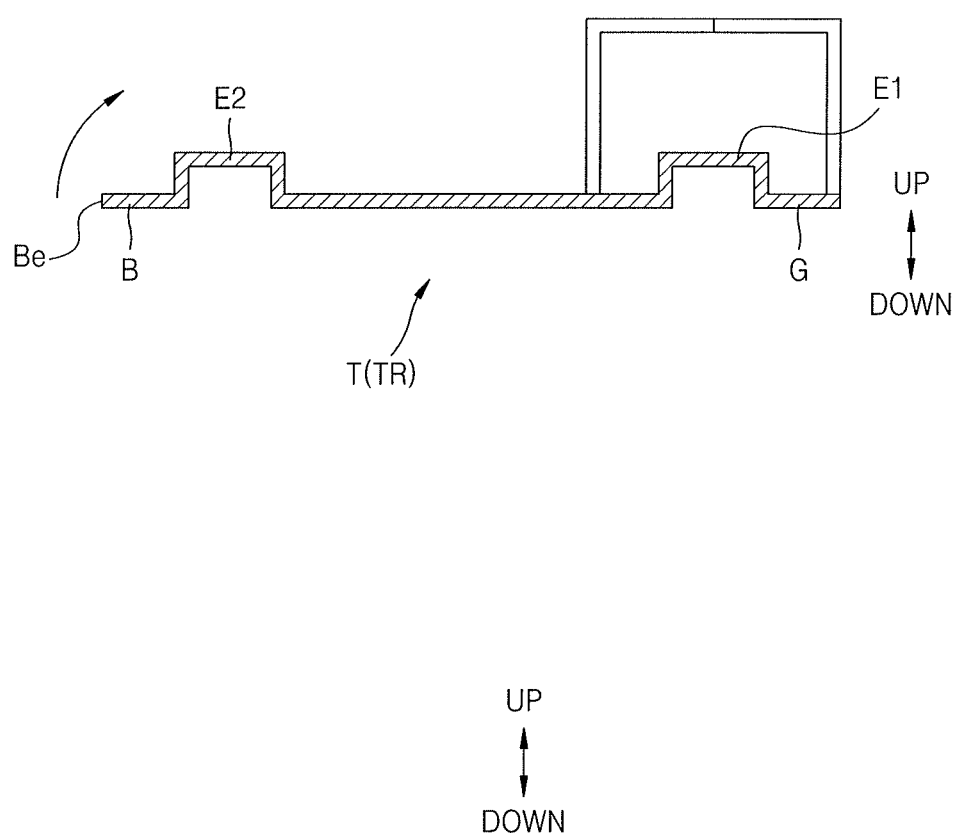
FIG. 4 is a cross-sectional view taken along line IV-IV of FIG. 3.
Figure 5:
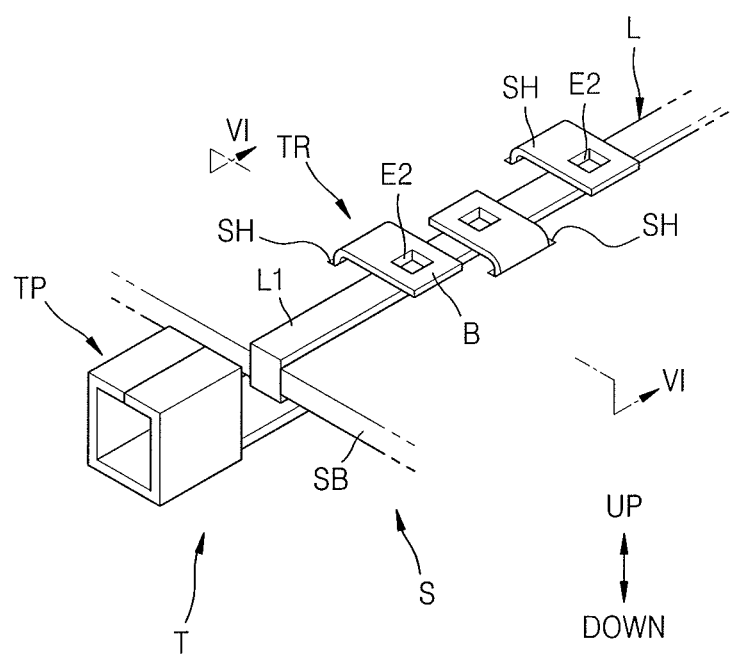
FIG. 5 is a view illustrating a structure of the connector terminal compressed onto the conductive line.
Figure 6:
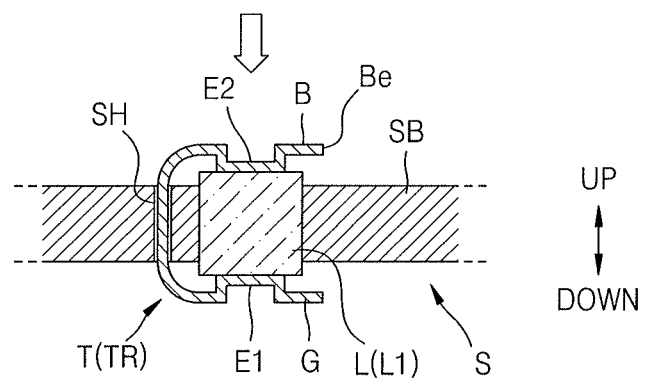
FIG. 6 is a cross-sectional view taken along line VI-VI of FIG. 5.
Figure 7:
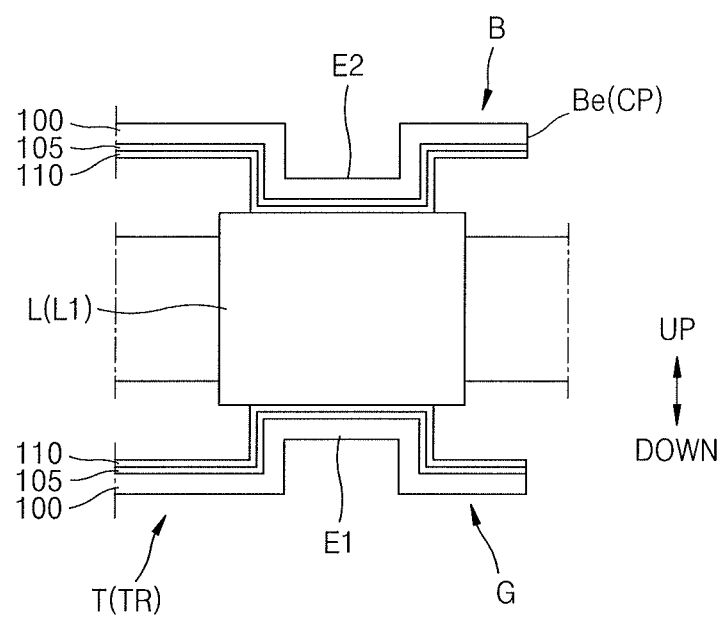
FIG. 7 is a cross-sectional view illustrating the connector terminal.

FIG. 2 is a perspective view illustrating the first end portions L1 of the wiring board S illustrated in FIG. 1. FIG. 3 is a view illustrating a structure of a connector terminal T forming an electrical contact with a conductive line L shown in FIG. 2. FIG. 4 is a cross-sectional view taken along line IV-IV of FIG. 3. In addition, FIG. 5 is a view illustrating a structure of the connector terminal T compressed on the conductive line L. In addition, FIG. 6 is a cross-sectional view taken along line VI-VI of FIG. 5. FIG. 7 is a cross-sectional view illustrating the connector terminal T.

Referring to FIG. 2, the wiring board S may have a function of transmitting state information of the battery cells 10 such as the temperatures and voltages of the battery cell 10 to the BMS (M). To this end, the wiring board S may include the conductive lines L which are patterned on the insulating base board SB. Both the upper and lower surfaces of the conductive lines L may be exposed in the thickness direction of the base board SB. For example, both the upper and lower surfaces of the conductive lines L may be exposed at the upper and lower surfaces of the base board SB, and may form electrical contacts with a connector terminal T.

The conductive lines L may be insulated from each other by the base board SB, each of the conductive lines L may include a plurality of strands, and different electrical signals may be transmitted respectively through the conductive lines L. In addition, each of the conductive lines L may pass through the base board SB in the thickness direction of the base board SB, and both the upper and lower surfaces of the conductive line L may be exposed. For example, the conductive lines L, which pass through the base board SB and are exposed on both the upper and lower surfaces thereof, may be coupled to the base board SB at lateral surfaces thereof except the upper and lower surfaces thereof, and optionally, the conductive lines L may be firmly coupled to the base board SB using additional protrusions (not shown) which protrude from the lateral surfaces of the conductive lines L toward the base board SB. The base board SB may be formed of an insulating material and may be located between the conductive lines L to insulate the conductive lines L from each other for preventing electrical interference therebetween.

The connector C may be connected to the first end portions L1 of the conductive lines L1. The connector C may include: the connector terminal T which forms physical connections with the conductive lines L of the wiring board S; and a connector housing H which accommodate the connector terminal T. The connector terminal T may be coupled to the conductive lines L of the wiring board S in a one-to-one manner. The connector terminal T may surround the first end portions L1 of the conductive lines L and may be firmly coupled to the conductive lines L. That is, the connector terminal T may include a plurality of connector terminals T which are respectively and physically coupled to the conductive lines L. The connector terminals T may be accommodated in the connector housing H in a densely arranged form, and the connector housing H may include partition walls W which surround each of the connector terminals T to define assembling positions of the connector terminals T. For example, the connector housing H may arrange the connector terminals T in one row or a matrix form, and may have a pattern that matches the mating connector CM (refer to FIG. 1) provided on a side of the BMS (M). The connector housing H may include first and second housings H1 and H2 which are coupled to each other while facing each other with the connector terminals T therebetween.

Each of the connector terminals T may include: a receiving portion TR on an end thereof which is close to the conductive lines L and a coupling portion TP on the other end thereof which is close to the BMS (M). The receiving portions TR of the connector terminals T, which are configured to receive the conductive lines L for coupling with the conductive lines L, may include bottom plates G and barrels B which protrude from the bottom plates G and are configured to be compressed onto the conductive lines L while surrounding the conductive lines L. The coupling portions TP of the connector terminals T are configured to be coupled to the mating connector CM (refer to FIG. 1) on the side of the BMS (M), and may be formed, for example, in a shape complementary to the mating connector CM for coupling with the mating connector CM. For example, the coupling portions TP of the connector terminals T may be formed in a complementary type which matches the male or female type of the mating connector CM on the side of the BMS (M).

Referring to FIGS. 2, 3 and 5, each of the conductive lines L1 may be accommodated in a connector terminal T surrounding the first end portion L1 of the conductive line L1, and may be compressed by the barrels B of the connector terminal T. In this case, the barrels B of the connector terminal T are inserted into through-holes SH of the base board SB in an upward direction from a lower side of the base board SB, and the barrels B which are exposed upward are compressed onto the conductive line L to surround the conductive line L. The through-holes SH may be formed through the base board SB such that the barrels B of the connector terminal T may pass through the base board SB through the through-holes SH. The through-holes SH may be formed through the base board SB at positions which are adjacent to the conductive line L and are staggered along both sides of the conductive line L in the length direction of the conductive line L according to the positions of the barrels B of the connector terminal T. That is, the through-holes SH may be staggered along both the left and right sides of the conductive line L in the length direction of the conductive line L, and the barrels B inserted into the through-holes SH of the base board SB may be compressed onto the conductive line L to surround the conductive line L from both sides of the conductive line L and form electrical contacts with the conductive line L.

More specifically, the barrels B may be arranged in a staggered pattern along both the left and right sides of the bottom plate G in the length direction of the bottom plate G. That is, the barrels B may be bent toward the conductive line L from both sides of the conductive line L and may be brought into tight contact with the conductive line L. To this end, the barrels B formed on both the left and right sides of the conductive line L may be arranged in a staggered pattern such that the barrels B may be bent toward the conductive line L from both the left and right sides of the conductive line L without interference therebetween. For example, the barrels B may be alternately arranged along both the left and right sides of the bottom plate G in the length direction of the bottom plate G.

The first end portion L1 of the conductive line L is exposed at both the upper and lower surfaces of the base board SB in the thickness direction of the base board SB, and the first end portion L1 of the conductive line L which is exposed at both the upper and lower surfaces of the base board SB may form electrical contacts with the connector terminal T. The other portion of the conductive line L other than the first end portion L1 may be insulated from the outside by insulating layers (not shown) formed on the upper and lower surfaces of the base board SB. As shown in FIG. 1, the second end portions L2 of the conductive lines L may be exposed to the battery cells 10 for connection with the bus bars 15 and/or the thermistors 16, and middle portions of the conductive lines L except the first and second end portions L1 and L2 of the conductive lines L may be covered with the insulating layers (not shown) formed on the upper and lower surfaces of the base board SB such that the conductive lines L may be insulated by the insulating layers (not shown) to prevent distortion of state information of the battery cells 10 caused by interference with the outside. Lower surfaces of the second end portions L2 of the conductive lines L, which face the battery cells 10, may be exposed to the battery cells 10, and upper surfaces of the second end portion L2 of the conductive lines L, which are opposite the battery cells 10, may be insulated by the insulating layers (not shown).

Referring to FIGS. 3, 4 and 6 together, each of the connector terminals T may include: the bottom plate G; and the barrels B protruding from the bottom plate G and configured to be compressed onto a conductive line L to surround the conductive line L. In this case, the bottom plate G and the barrels B may include first and second embossments E1 and E2 which protrude toward the conductive line L for being respectively brought into tight contact with the upper and lower surfaces of the conductive line L. The first and second embossments E1 and E2 may be formed by embossing the bottom plate G and the barrels B such that the first and second embossments E1 and E2 may have an embossed shape on sides of the bottom plate G and the barrels B and a depressed shape on the other sides of the bottom plate G and the barrels B. More specifically, the first embossments E1 may be formed in an embossed shape on an upper surface of the bottom plate G facing the conductive line L, and may be compressed onto the conductive line L. The second embossments E2 may be formed in an embossed shape on surfaces of the barrels B facing the conductive line L, and may be compressed onto the conductive line L.

Referring to FIGS. 5 and 6, the barrels B may be fitted into the through-holes SH from a lower side of the wiring board S (more specifically, the base board SB) toward an upward side of the wiring board S, and the barrels B exposed to the upward side of the wiring board S may be compressed onto the conductive line L from both sides of the conductive line L to surround the conductive line L. In this case, the barrels B may be compressed onto the upper surface of the conductive line L, and along with this, the lower surface of the conductive line L which is biased downward by the barrels B may be compressed onto the bottom plate G. That is, the conductive line L may form conductive contacts with the barrels B and the bottom plate G in such a manner that the exposed upper surface of the conductive line L forms conductive contacts with the barrels B (more specifically, with the second embossments E2), and the exposed lower surface of the conductive line L forms a conductive contact with the bottom plate G (more specifically, with the first embossments E1). To this end, the barrel B may be compressed with a sufficient pressing force against the upper surface of the conductive line L, and the lower surface of the conductive line L biased by the barrels B may be compressed against the bottom plate G.

Referring to FIG. 7, the connector terminal T may include a base metal 100 and a plating film 110 formed on the base metal 100. At least the receiving portion TR of the connector terminal T, which forms an electrical contact with the conductive line L, may include the base metal 100 and the plating film 110 formed on the base metal 100.

The base metal 100 may include a metallic material having high electrical conductivity, for example, copper (Cu). The plating film 110 may protect the surface of the base metal 100 and prevent electrical contact defects which may be caused by deterioration of the base metal 100 such as oxidation of the base metal 100. The plating film 110 may include a tin (Sn) alloy, and more specifically, a tin (Sn)-copper (Cu) alloy or a tin (Sn)-silver (Ag)-copper (Cu) alloy. A base metal film 105 may be formed between the base metal 100 and the plating film 110 to maintain satisfactory contact between the base metal 100 and the plating film 110. The base metal film 105 may include nickel. In another embodiment of the present disclosure, the plating film 110 may include a nickel (Ni) alloy, and more specifically, a nickel (Ni)-copper (Cu) alloy.

Since the plating film 110 is formed on surfaces of the second embossments E2 of the barrels B, the surfaces of the second embossments E2 are protected by the plating film 110, and surface deterioration such as the formation of an oxide film is prevented. Therefore, good electrical contact may be guaranteed between the second embossments E2 and the conductive line L, and signal distortion may not be caused by poor contact or an increase in electrical resistance.

More specifically, the barrels B are brought into electrical contact with the conductive line L through the second embossments E2 formed on the surfaces of the barrels B which face the conductive line L. The plating film 110 is formed on the second embossments E2, and the base metal 100 is not exposed to the outside owing to the plating film 110, thereby preventing deterioration such as oxidation of the base metal 100 and guaranteeing good electrical contact. Unlike this, when the plating film 110 is not formed on the barrels B at electrical contact points with the conductive line L and thus the base metal 100 of the barrels B is exposed to the outside, the contact points of the barrels B may deteriorate, for example, due to the formation of an oxide film, and thus a signal of the conductive line L may be distorted because of poor electrical contact and an increase in contact resistance.

Since the plating film 110 is formed on surfaces of the first embossments E1 of the bottom plate G, which make contact with the conductive line L, as well as being formed on the second embossments E2 of the barrels B, the surfaces of the embossments E1 are protected by the plating film 110 without deterioration such as the formation of an oxide film. Therefore, good electrical contact may be guaranteed between the second embossments E2 and the conductive line L, and signal distortion may not be caused by poor contact or an increase in electrical resistance.

Figure 8:
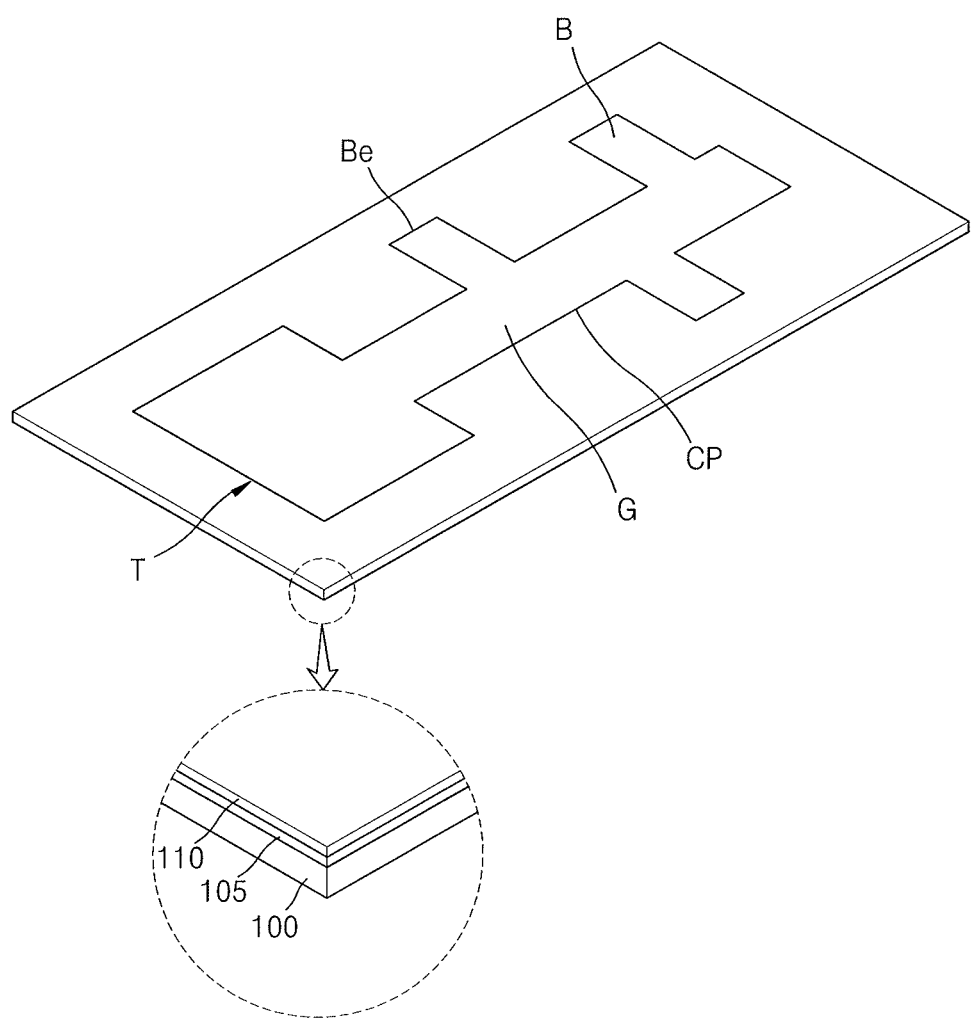
FIG. 8 is a view illustrating the formation of the connector terminal illustrated in FIG. 7.

FIG. 8 is a view illustrating the formation of the connector terminal T shown in FIG. 7.

The connector terminal T including the barrels B and the bottom plate G may be formed as follows: the plating film 110 is first formed on the base metal 100 having a plate shape, and then the base metal 100 on which the plating film 110 is formed is punched with a press to form the barrels B. Thus, cut surfaces CP are formed at leading edges Be of the barrels B, and the base metal 100 may be exposed at the cut surfaces CP of the barrels B because the plating film 110 is not formed on the cut surfaces CP in the thickness direction of the barrels B. As shown in FIG. 7, in the present disclosure, electrical contacts with the conductive line L are not formed through the leading edges Be of the barrels B, that is, through the cut surfaces CP of the barrels B, but are formed through the second embossments E2 formed at inner positions of the barrels B which are distant from the leading edges Be, thereby preventing contact errors caused by deterioration of the base metal 100 or signal distortion caused by an increase in contact resistance.

Figure 9:
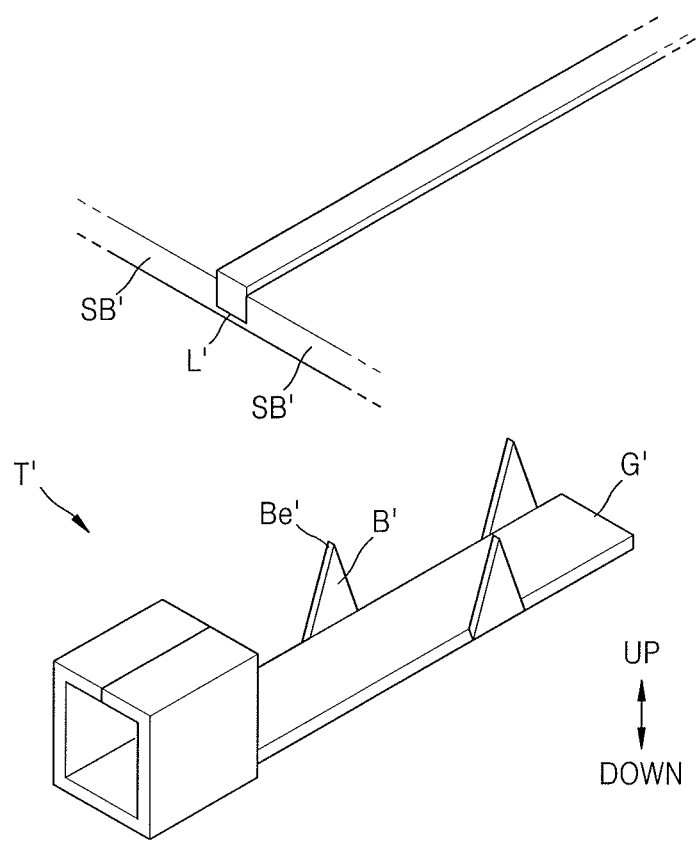
FIG. 9 is a view illustrating an electrical connection between a conductive line and a connector terminal according to a comparative example for comparison with the present disclosure.
Figure 10:
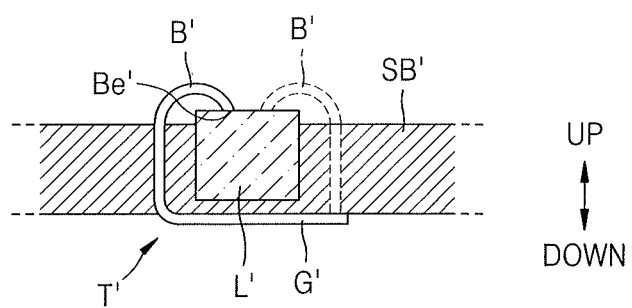
FIGS. 10 and 11 are views illustrating a contact state between the conductive line and the connector terminal in the comparative example illustrated in FIG. 9.
Figure 11:
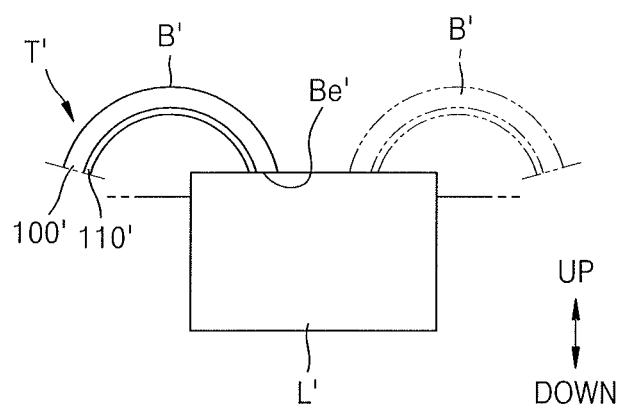

FIG. 9 is a view illustrating an electrical connection between a conductive line L' and a connector terminal T' according to a comparative example for comparison with the present disclosure. FIGS. 10 and 11 are views illustrating a contact state between the conductive line L' and the connector terminal T' in the comparative example shown in FIG. 9.

In the comparative example shown in FIGS. 9 to 11, barrels B' of the connector terminal T' may be inserted through a base board SB' on which the conductive line L' is formed, and may then be compressed onto the base board SB' from both sides of the conductive line L'. In this case, leading edges Be' of the barrels B' may be compressed onto the conductive line L', and the leading edges Be' of the barrels B' may thus be brought into electrical contact with the conductive line L'.

In the comparative example shown in FIG. 9, the barrels B' are pushed from a lower surface toward an upper surface of the base board SB' to insert the barrels B' through the base board SB' while determining the insertion positions of the barrels B' according to work conditions or by the skill of a worker in a state in which the insertion positions of the barrels B' are not previously determined, and thus the insertion positions of the barrels B' may not be correctly determined to cause errors such as an error in which the leading edges Be' of the barrels B' penetrate the conductive line L'.

According to the present disclosure, as illustrated in FIG. 2, the insertion positions of the barrels B may be determined by the through-holes SH formed in the base board SB, and since the barrels B are inserted through the through-holes SH which are previously formed, it is possible to prevent the problem in which the insertion positions of the barrels B are incorrect, that is, the alignment error in which the barrels B are not inserted through correct insertion locations, that is, lateral sides of the conductive lines L but are inserted through the conductive lines L. In this sense, the through-holes SH formed in the base board SB in the present disclosure may be considered as structures for position alignment between the base board SB and the connector terminals T including the barrels B.

In the comparative example illustrated in FIG. 10, the conductive line L' is exposed only at the upper surface of the base board SB', and the lower surface of the conductive line L' is covered with the base board SB'. In addition, the conductive line L' forms electrical contacts with the barrels B' only through the upper surface of the conductive line L' which is exposed from the base board SB'. That is, in the comparative example, the conductive line L' does not form an electrical contact with a bottom plate G' of the connector terminal T', and thus the contact area between the conductive line L' and the connector terminal T' is limited, causing an increase in contact resistance and signal distortion.

According to the present disclosure, as shown in FIG. 6, the conductive line L is exposed at both the upper and lower surfaces of the base board SB, and the exposed upper and lower surfaces of the conductive line L make electric contact with the barrels B (more specifically, the second embossments E2 of the barrels B) and the bottom plate G (more specifically, the first embossments E1 of the bottom plate G), thereby guaranteeing a large contact area between the conductive line L and the connector terminal T and preventing signal distortion.

In the comparative example shown in FIG. 11, the barrels B' are brought into electrical contact with the conductive line L' through the leading edges Be' of the barrels B'. The barrels B' may be formed to have the leading edges Be' through a press punching process after a plating process, and thus, the leading edges Be' of the barrels B' may have cut surfaces. The leading edges Be' of the barrels B' on which the cut surfaces are formed as described above may not be coated with a plating film 110' in the thickness direction of the barrels B', and a base metal 100' may be directly exposed to the outside through the cut surfaces, thereby causing deterioration such as the formation of an oxide on the base metal 100' which is exposed to the outside without protection by the plating film 110', and causing an increase in the contact resistance between the barrels B' and the conductive line L'.

According to the present disclosure, as shown in FIG. 7, since the barrels B are brought into electrical contact with the conductive line L not through the leading edges Be of the barrels B but through the second embossments E2 formed at inner positions of the barrels B, deterioration of the cut surfaces CP at the leading edges of the barrels B may not have an effect on contact resistance, and electrical contacts with the conductive line L are formed through the second embossments E2 formed at the inner positions of the barrels B which are distant from the leading edges Be of the barrels B. Since the plating film 110 is formed on the surfaces of the second embossments E2, problems such as a contact resistance increase caused by surface deterioration may not occur.

Figure 12:
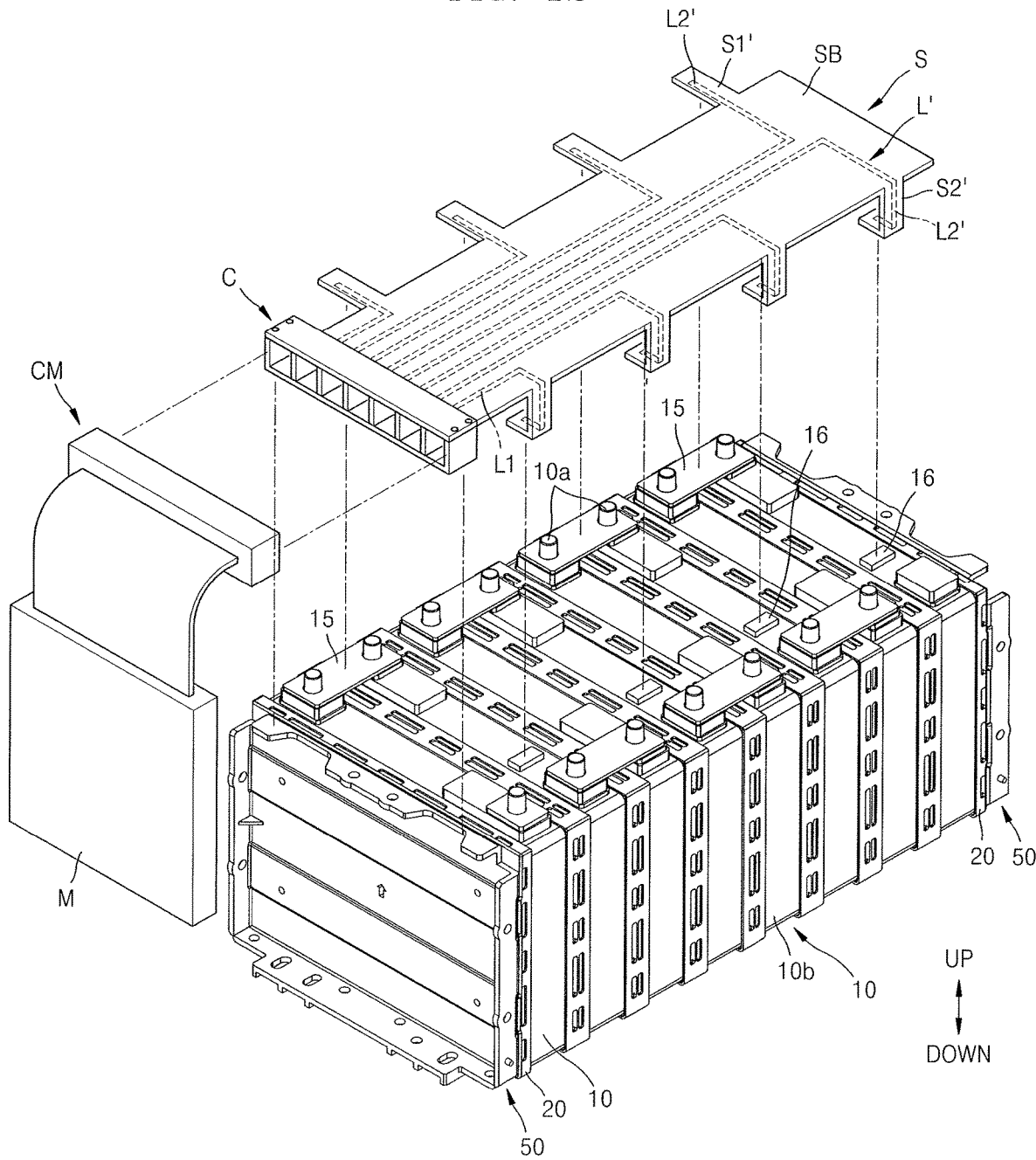
FIG. 12 is a view illustrating a battery pack according to another embodiment of the present disclosure.

FIG. 12 is a view illustrating a battery pack according to another embodiment of the present disclosure.

Referring to the drawing, state information such as the voltages or temperatures of battery cells 10 may be collected in a BMS (M) through a wiring board S. The wiring board S may transmit electrical signals related to the voltages or temperatures of the battery cells 10 to the BMS (M).

The wiring board S may include a plurality of conductive lines L', and each of the conductive lines L' may include: a first end portion L1 which is adjacent to the BMS (M) and through which battery cell state information is output to the BMS (M); and a second end portion L2' which is adjacent to battery cells 10 and through which battery cell state information is input.

The first end portions L1 of the conductive lines L' may correspond to output points of the conductive lines L' through which the state information of the battery cells 10 is output, and may correspond to contacts between the conductive lines L' and a connector C. The second end portions L2' of the conductive lines L' may correspond to input points of the conductive lines L' through which the state information of the battery cells 10 is input.

In the present embodiment, the second end portions L2' may be formed in two different types. Each of the second end portions L2' of one type may correspond to a contact with a bus bar 15 having the same electrical potential as that of an electrode 10a of a battery cell 10, and the voltage information of the battery cell 10 may be input to the second end portion L2' of the conductive line L' through the bus bar 15. Each of the second end portions L2' of the other type may correspond to a contact with a thermistor 16 placed on a case 10b of a battery cell 10, and the temperature information of the battery cell 10 may be input to the second end portion L2' of the conductive line L' from the thermistor 16.

The wiring board S may include first and second branch portions S1' and S2' having different structures and extending from a main body of the wiring board S for implementing the second end portions L2' of different types. The first branch portions S1' may extend from the main body of the wiring board S toward bus bars 15 which connect adjacent battery cells 10 to each other, and the second branch portions S2' may extend from the main body of the wiring board S toward the upper surfaces of the battery cells 10 in a downward direction for being placed on the upper surfaces of the battery cells 10. Furthermore, in the present embodiment, the connection structure between the first end portions L1 of the conductive lines L' and the connector C is substantially the same as that described above, and thus a description thereof will be omitted.

While embodiments of the present disclosure have been described with reference to the accompanying drawings, the embodiments are for illustrative purposes only, and it will be understood by those of ordinary skill in the art that various modifications and equivalent other embodiments may be made therefrom. Therefore, the scope and spirit of the present disclosure should be defined by the following claims.

INDUSTRIAL APPLICABILITY

The present disclosure may be applied to battery packs which are rechargeable energy sources, and to various devices which use battery packs as power sources.

The invention claimed is:

1. A battery pack, comprising:
a plurality of battery cells;
a battery management system configured to acquire state information of the plurality of battery cells and control charge-discharge operations of the plurality of battery cells;
a wiring board through which the state information of the plurality of battery cells is transmitted to the battery management system, the wiring board including a plurality of conductive lines for transmitting different electrical signals; and
a connector including a plurality of connector terminals that correspond to and are coupled to the plurality of conductive lines and a connector housing accommodating the plurality of connector terminals, the connector being coupled to a mating connector of the battery management system, wherein a first connector terminal from among the plurality of connector terminals includes:
a bottom plate accommodating a first conductive line from among the plurality of conductive lines, wherein the bottom plate extends along the major length of the first conductive line while accommodating the first conductive line, the bottom plate including a first embossment in an upper surface thereof, the first embossment protruding upward toward a bottom side of the first conductive line; and
a barrel protruding upward from the bottom plate, the barrel surrounding a first lateral side and an upper surface of the first conductive line, while extending in a direction perpendicular to a direction in which the bottom plate extends and compressed onto the first conductive line, the barrel including a second embossment that protrudes downward toward the top side of the first conductive line.

2. The battery pack of claim 1, wherein the first and second embossments respectively make electrical contact with lower and upper surfaces of the first conductive line.

3. The battery pack of claim 1, wherein the first and second embossments are respectively embossed on the bottom plate and the barrel to have an embossed shape on a side and a depressed shape on an opposite side.

4. The battery pack of claim 1, wherein the second embossment is formed at an inner position of the barrel, the inner position of the barrel being spaced away from a leading edge of the barrel.

5. The battery pack of claim 4, wherein a cut surface is formed on the leading edge of the barrel.

6. The battery pack of claim 1, wherein a plating film is formed on surfaces of the first and second embossments.

7. The battery pack of claim 6, wherein the plating film is formed on a base metal of the first connector terminal.

8. The battery pack of claim 7, wherein the base metal is exposed at a leading edge of the barrel without being covered with the plating film.

9. The battery pack of claim 1, wherein the wiring board further includes an insulating base board formed between the plurality of conductive lines to physically couple the plurality of conductive lines to each other and insulate the plurality of conductive lines from each other.

10. The battery pack of claim 9, wherein
the plurality of conductive lines includes a plurality of first end portions respectively coupled to the plurality of connector terminals, and
upper and lower surfaces of the first end portions, in a thickness direction of the base board, are exposed from the base board.

11. The battery pack of claim 9, wherein:
the base board has a through-hole penetrating therethrough, and the barrel extends through the through-hole, and
the base board defines an entire perimeter of the through-hole such that a portion of the barrel within the through-hole is insulated from the first conductive line by the base board.

12. The battery pack of claim 9, wherein:
through-holes are formed in the base board to receive a plurality of the barrels therethrough, and
the through-holes are formed through both sides of the base board adjacent to the plurality of conductive lines, the through-holes being alternately arranged on left and right sides of the plurality of conductive lines at staggered positions along a length of the plurality of conductive lines.

13. The battery pack of claim 12, wherein the plurality of barrels are fitted into the through-holes, and are compressed onto the plurality of conductive lines from the staggered positions which are arranged on the left and right sides of the plurality of conductive lines along the length of the plurality of conductive lines.

14. The battery pack of claim 13, wherein the plurality of barrels are compressed onto upper surfaces of the plurality of conductive lines, and lower surfaces of the plurality of conductive lines biased by the plurality of barrels are compressed onto bottom plates of the plurality of connector terminals.

15. The battery pack of claim 1, wherein the first connector terminal includes:
a receiving portion formed on an end thereof and coupled to the first conductive line while receiving the first conductive line; and
a coupling portion formed on another end, opposite the receiving portion, and having a complementary shape matching the mating connector of the battery management system.

16. The battery pack of claim 15, wherein the receiving portion includes the bottom plate and the barrel.

17. The battery pack of claim 1, wherein the plurality of conductive lines include:
first end portions formed on respective ends thereof, the first end portions being physically coupled to corresponding ones of the plurality of connector terminals and configured to output the state information of the plurality of battery cells to the battery management system; and
second end portions formed on other ends thereof, which are opposite the first end portions, the second end portions being configured to receive the state information of the plurality of battery cells.

18. The battery pack of claim 17, wherein:
the first end portions of the plurality of conductive lines are collected in a dense form by the connector and are connected to the battery management system, and
the second end portions of the plurality of conductive lines are distributed to different positions toward different battery cells.

19. The battery pack of claim 17, wherein the second end portions of the plurality of conductive lines are electrically connected to bus bars which electrically connect different battery cells.

20. The battery pack of claim 1, wherein the state information transmitted through the plurality of conductive lines includes voltage information and temperature information of the plurality of battery cells.

21. The battery pack of claim 1, wherein:
the plurality of connector terminals are coupled to the plurality of conductive lines in a one-to-one manner, and
assembly positions of the plurality of connector terminals are aligned by the connector housing.

* * * * *